US005770319A

United States Patent [19]

Franich et al.

[11] Patent Number: 5,770,319
[45] Date of Patent: Jun. 23, 1998

[54] DENSIFICATION OF LIGNOCELLULOSIC MATERIAL

[75] Inventors: Robert Franich; Kathryn Anderson, both of Rotorua, New Zealand

[73] Assignee: Her Majesty the Queen in Right of New Zealand, New Zealand

[21] Appl. No.: 359,344

[22] Filed: Dec. 19, 1994

Related U.S. Application Data

[63] Continuation of Ser. No. 222,003, Apr. 4, 1994, abandoned, which is a continuation of Ser. No. 839,815, Feb. 21, 1992, abandoned.

[30] Foreign Application Priority Data

Aug. 23, 1990 [NZ] New Zealand .......................... 235036

[51] Int. Cl.$^6$ ................................ B27K 3/00; C08L 3/02; C08L 1/02
[52] U.S. Cl. .......................... 428/528; 428/529; 428/533; 428/537.1; 524/47; 524/48; 524/50; 527/103; 527/105; 527/300; 527/312; 427/297; 427/440
[58] Field of Search ...................................... 527/103, 105, 527/312, 300; 524/47, 48, 50; 428/528, 529, 533, 537.1; 427/297, 440

[56] References Cited

U.S. PATENT DOCUMENTS

| | | | |
|---|---|---|---|
| 2,442,897 | 6/1948 | Loughborough | 527/105 |
| 2,455,427 | 12/1948 | Loughborough | 524/47 |
| 4,005,039 | 1/1977 | Gardiner | 427/440 |
| 4,017,257 | 4/1977 | Weil | 8/115.5 |
| 4,276,329 | 6/1981 | Vasishth et al. | 524/376 |
| 4,382,884 | 5/1983 | Rohringer et al. | 252/606 |
| 5,026,746 | 6/1991 | Floyd et al. | 524/50 |
| 5,037,657 | 8/1991 | Jones et al. | 424/466 |
| 5,162,394 | 11/1992 | Trocino et al. | 523/208 |
| 5,246,603 | 9/1993 | Tsaur et al. | 252/86 |

OTHER PUBLICATIONS

Grant and Haakh's Chemical Dictionary, fifth edition (1987), p. 351.

*Primary Examiner*—Jeffrey C. Mullis
*Attorney, Agent, or Firm*—Whitman Breed Abbott & Morgan LLP

[57] ABSTRACT

The invention comprises a method of densifying lignocellulosic material such as wood. The wood is impregnated with a maltodextrin solution under vacuum and/or pressure and the maltodextrin is then cross linked to insolubilise the maltodextrin. A wood-polymer composite is formed. Suitable cross linking agents include compounds having at least one hydroxyl group. Maltodextrins having a dextrose equivalent in the range 15 to 30 are preferred. The resulting composite material has improved appearance, hardness, impact resistance, strength and water repellency.

28 Claims, No Drawings

DENSIFICATION OF LIGNOCELLULOSIC MATERIAL

This application is a continuation of application Ser. No. 08/222,003, filed Apr. 4, 1994, which is a continuation of application Ser. No. 07/839,815, filed Feb. 21, 1992, both abandoned.

The invention comprises a method of densifying lignocellulosic material including wood, to form a composite material.

Porous and cellular or lignocellulosic materials, such as wood may be treated with chemicals, which on polymerisation may fill the voids in the substrate and/or react with the cell wall biopolymers, thereby increasing the density and consequently the hardness of the material.

Well-known procedures for carrying out this process include firstly treating the wood with styrene, methyl methacrylate, diethyl phthalate and other monomers containing a vinyl group together with an optional polymerisation catalyst. The treated wood may be then heated, or irradiated for example from a $^{60}$Co gamma ray source to initiate polymerisation to form a polymer which fills the voids of the cellular structure of the wood. Such a wood composite material has superior hardness properties compared with most natural dense, hard woods.

Similarly, wood may be treated with a reactive chemical such as phenol-formaldehyde resin, which on heating undergoes condensation polymerisation to form a hard, often dark coloured polymer which having reacted with the wood cell wall biopolymers as well as filling the wood cell voids creates a dense, hard (but usually dark coloured) composite material.

It is an object of the invention to provide an improved or at least alternative method for densifying lignocellulosic material including wood.

Accordingly the invention may broadly be said to comprise a method of densifying lignocellulosic material, comprising impregnating the lignocellulosic material with a maltodextrin (as herein defined) having a dextrose equivalent up to 100 and cross-linking or curing the maltodextrin to substantially insolubilise the cross-linked product, to form a composite material.

The maltodextrin may be impregnated into the lignocellulosic material together with a cross-linking agent having at least one hydroxyl group or alkylated hydroxyl group, or the maltodextrin may be pre-reacted with a cross-linking agent having at least one hydroxyl group or alkylated hydroxyl group to partially cross-link the maltodextrin and cross-linking agent prior to impregnation into the lignocellulosic material, for example.

The invention also comprises a composite material whenever produced by the method the invention.

The method of the invention may be used to densify wood including solid wood whether softwood or hardwood, such as blocks, planks, cut, turned or fashioned wood or wooden articles, and including reconstituted wood products such as particle board, fibreboard, and wafer board for example, and also other non-wood lignocellulosic materials such as for example cardboard and paper.

Wood or other lignocellulosic material treated by the method of the invention is densified and may also have improved hardness, impact resistance, strength and water repellency, as well as possibly improved gluability, bond strength, decay resistance, and stability to light induced discolouration, when compared with untreated lignocellulosic material. Also, the wood may have improved decorative properties. The surface of maltodextrin-densified wood composite has an attractive appearance when polished and is less "plastic" or synthetic in appearance than composites manufactured from wood and vinyl monomers such as methyl methacrylate for example.

Any suitable maltodextrin having a dextrose value up to 100 as determined by the Fehlings solution titration method maybe employed. Maltodextrin in this specification means a polysaccharide derived from α-1.4 linked α-D-glucose. Specific maltodextrins are given chain length names and examples of maltodextrins include maltotetraose, maltohexaose, and maltodecaose. Maltodextrin includes stereo and optical isomers thereof. Particularly preferred are those having a dextrose equivalent in the range 15 to 30.

The maltodextrin may be alone or in combination with one or more other maltodextrins or combined with other water-soluble carbohydrates such as starch hydrolysates including other dextrins, carbohydrate gums, and resins for example.

Maltodextrin in this specification also includes maltodextrins specifically modified for example by acetylation, sulphonation, dehydration, etc.

Preferably the cross-linking agent comprises a compound having an alkylated hydroxymethyl, hydroxymethylene, or hydroxymethine group, such as an alkylated methylolmelamine, a glycouril, a benzoguanamine, methylol resins or a methylurea resin. A particularly preferred cross-linking agent is hexamethylmethylolmelamine. In this case the ratio of maltodextrin molecules to cross-linking agent molecules is preferably in the range 2:1 to 5:1 and most preferably 4:1.

Another suitable cross-linking agent comprises a non-alkylated methylol group which reacts with the maltodextrin, the product being cross-linked via vinyl group polymerisation. In this case the ratio of maltodextrin molecules to cross-linking agent molecules is preferably 1:1.

According to the invention, lignocellulosic substrates are densified to form composite material. The material, for example solid wood or wood veneer is impregnated preferably under conditions of reduced, then elevated pressure at ambient temperature with a maltodextrin, either mixed with a cross-linking agent, or previously reacted including condensed with a cross-linking agent, preferably in an aqueous formulation, or in a suitable solvent. Any desired evacuation—pressure schedule including evacuation and/or pressure and/or cycles of same as known in the art for impregnating wood, typically utilising evacuation and/or pressure in the range—50 kPa g to 1400 kPa g may be employed.

After impregnation into the wood, the maltodextrin is cross-linked or cured to substantially insolubilise the maltodextrin to form the lignocellulosic-polymer composite. The impregnated wood may be heated in a oven or kiln at a temperature and for a time sufficient to cause drying of the substrate and cross-linking and curing of the maltodextrin, or further cross-linking if the maltodextrin has been partially cross-linked prior to impregnation, to a hard polymer-type material within the wood structure.

The wood may be subjected to a temperature from ambient temperature to 150° C., most preferably in the range 50° to 140° C., and particularly at about 70° C. Heating can be for a time of from many days at low temperatures, to a few minutes at higher temperatures, depending on the wood dimensions. Cross-linking or curing may be carried out in a production situation by the impregnated wood being dried in a conventional or high temperature wood seasoning kiln, or during hot pressing of impregnated veneers to a substrate. At temperatures in the range 50° to 70° C. heating may typically be carried out for a time of form 12 to 250 hours, depending on the wood dimensions. Cross-linking or curing may be carried out without use of an oven or kiln, by allowing the wood to air dry for a number of such as 100 days, but the time required may be excessively long for commercial manufacture.

In the case of veneers, lamination of the treated veneers onto a suitable substrate may be accomplished by cold-pressing followed by a brief heating period typically of a few minutes to a temperature in the range 80° to 150° C. to effect cross-linking similar to conventional plywood manufacturing conditions, but typically at 140° C. for 3 to 20 minutes depending on the substrate thickness.

At the same time as the maltodextrin is impregnated into the wood, additives such as preservatives, fire retardants or wood colouring agents may also be deposited in the wood and fixed therein when the maltodextrin is insolubilised. Thus in a single treatment the wood may be densified, as well as preservative and fire retardancy treated and also coloured if desired.

The following examples further illustrate the invention. The examples are of the treatment of wood but the method of the invention can be applied to other lignocellulosic material such as paper and cardboard. The method of the invention results in filling of voids with a rigid polymeric plastics-type material and also in partial reaction with and strengthening of the cell walls of the lignocellulosic material.

A. Treatment Formulations

In the examples preparation of the treatment formulations used in each example is separately described for clarity. The treatment solutions were prepared as follows:

Solution 1

7.907 kg of a maltodextrin of dextrose equivalent=15 was dissolved in 15.507 kg of water to which was added a solution of 1.493 kg of hexamethylmethylolmelamine as a hydroxyl group cross-linking agent in 1.493 kg of methanol, and also 118 g of boric acid as a preservative, 80.7 g of toluene-p-sulphonic acid as a catalyst, and sorbitan oleate as a non-ionic surfactant. The pH of the resulting emulsion was adjusted to 8 by addition of ammonia solution (density 0.88 g/m.). This mixture tended to separate after standing for several days into an upper layer containing the maltodextrin, and lower layer containing the hexamethylmethylolmelamine, so prior to wood treatment the mixture was thoroughly agitated to form a uniform emulsion. This treatment emulsion had a maltodextrin to hexamethylmethylolmelamine molar ratio of approximately 5:1, a density of approximately 1.12 g/ml$^{-1}$, a viscosity of 70 cps at 20° C. (Brookfield Viscometer spindler No. 5 at 100 rpm), and a solids content of 37%.

Solution 2

7.149 kg of a maltodextrin of dextrose equivalent=10 was dissolved in 14.750 kg of water, to which was added a solution of 2.252 kg of hexamethylmethylolmelamine as a hydroxyl group cross-linking agent in 2.250 kg of methanol. 107 g of boric acid wad added. as a preservative, and 73 g of toluene-p-sulphonic acid as a catalyst. The mixture was stirred at 20° C. for 4–5 hours in an open vessel until all the hexamethylmethylolmelamine methanol solution had dissolved in the aqueous layer, by partial reaction of the methylated methylol groups with the hydroxyl groups of the maltodextrin. After a clear, homogenous solution was obtained, ammonia (density 0.88 g/ml) was added to bring the pH to 8 in order to arrest any further reaction. This solution was found to be stable for many months at pH 8, and to have a maltodextrin to hexamethylmethylolmelamine molar ratio of approximately 3:1, a density of approximately 1.12 g/mL, a viscosity of 50 cps at 20° C. (Brookfield Viscometer spindle No. 5 at 100 rpm), and a solids content of 36%.

Solution 3

5.957 kg of maltodextrin of dextrose equivalent=28 was dissolved 13.6 kg of water and was treated with a solution of a 3.4 kg of hexamethylmethylolmelamine in 3.4 kg of methanol. 89 kg of boric acid was added as a preservative and 61 g of toluene-p-sulphonic acid as a catalyst. The mixture was stirred at 20° C. for 4–5 hours in an open vessel until all the hexamethylmethyolomelamine methanol solution had dissolved in the aqueous layer, by partial reaction of the methylated methylol groups with the hydroxyl groups of the maltodextrin. A clear, homogenous solution was obtained. Ammonia (density 0,88 g/mL) was added to bring the pH to 8 in order to arrest any further reaction. This solution was stable at pH 8, and had a maltodextrin to hexamethylmethylolmelamine molar ratio of approximately 2:1, a density of approximately 1.10 g/ml, a viscosity of 50 cps at 20° C., and a solids content of 37%.

Solution 4

15.8 kg of a maltodextrin of dextrose equivalent=15 was dissolved in 20.0 kg of water to which was added 0.24 kg of boric acid as a preservative and 0.04 kg of toluene-p-sulphonic acid catalyst. To this solution was added in one portion, a solution of 3.73 kg hexamethylmethylolmelamine in 16.00 kg of methanol and the mixture was then stirred at 20°–25° C. for 2–3 hours during which time partial cross linking of the hexaxmethylmethylolmelamine with the maltodextrin occurred. After a clear, homogenous solution had formed ammonia (density of 0.99 g/mL) was added to bring the pH to 8 in order to arrest any further hydroxyl group reaction with the hexamethylmethylolmelamine. Finally, 0.08 kg of cyanoguanidine was added to trap any free formaldehyde in the finished formulation. The formulation which had a hexamethylmethylolmelamine molar ratio of 4:1 is stable for many months at pH 8, and had a density of 1.1 g/ml and a viscosity of 60 cps at 20° C. (Brookfield Viscometer, spindle No. 5 100 rpm).

Solution 5

19.8 kg of a maltodextrin of dextrose equivalent=15 is dissolved in 42 kg of water and to the solution was added 0.39 kg of boric acid, and 0.08 kg toluene-p-sulphonic catalyst. 9.3 kg of N-methylolacrylamide as a cross-linking agent was added to the stirred solution, and the mixture stirred at 20° C. for 4 hours until homogenous during which time the N-methylolacrylamide reacted with the maltodextrin. To the final formulation was added 0.033 kg of p-methoxyphenol (0.033 kg) as polymerisation inhibitor. The solution was stable for many months kept in plastic containers, and sealed from contact with air. The solution had a viscosity of 60 cps at 20° C. (Brookfield viscometer).

B. Impregnation and curing

EXAMPLE 1

Solid Wood

Blocks of radiata pine sapwood (*Pinus radiata*) of dimensions 200×45×45 mm having a density of 410–480 kg/m$^3$, and a moisture content of 12% were placed in a Parr high pressure reaction vessel (suitable for 1400 kPa or 200 psi). Blocks of glass were placed on the wood to prevent the blocks from floating. The vessel was sealed and evacuated to −85kPa g at ambient temperature. Sufficient of treatment solution 1 was passed into the vessel through a valved port to completely cover the blocks, with an excess volume greater than that of the wood after the vessel had been evacuated. After 15 minutes the vessel was pressurized to 1400 kPa g for 2 hours. Then the remaining solution was pumped out and the vessel opened.

The impregnated wood was then heated at a temperature of 70° C. for 50 hours for cross linking of the maltodextrin, and drying.

EXAMPLE 2

Solid Wood

Planks of radiata pine sapwood of up to 100×50×100 mm were placed in a treatment vessel and the vessel was sealed. The wood planks were evacuated separately to −85kPa g. Sufficient treatment solution 2 was then introduced through a valved port. The wood was subjected to a vacuum-pressure cycle as described in Example 1.

EXAMPLE 3

Veneer

Sheets of radiata pine veneer were placed in an autoclavable container. The sheets were weighed down and then covered with treatment solution 3. The container was then placed in a large pressure chamber. The chamber was sealed and evacuated and after five minutes at a vacuum of −80 kPa g the vacuum was collapsed and the pressure then released and the veneers removed for air-drying. After drying for two hours, the veneer sheets were glued to the face of a section of five-ply radiata pine plywood using urea-formaldehyde adhesive and then pressed under 10 tonnes force with the press of 80° C. for six minutes. This was sufficient to cross link the maltodestrin and cure the adhesive. The surface of the veneer was then slightly sanded and polished.

EXAMPLE 4

Veneer

Veneers were treated and hot pressed as described in Example 3 but using treatment solution 2, and then hot pressed to five-ply radiata pine plywood as described in Example 3 but at 140° C. for five minutes.

EXAMPLE 5

Samples of radiata pine sapwood of dimensions 100×15×15 mm were treated as described in Example 1 using solution 2 and after curing were tested for surface hardness by measuring the force required to indent the surface by 1 mm using a stainless steel wedge. A mean hardness of 200 MPa was recorded which compared with the range of 60–90 MPa for untreated radiata pine sapwood, and 100–110 for kiln-dried radiata pine sapwood.

EXAMPLE 6

Samples of radiata pine sapwood of dimensions 90 mm tangential×18 mm radial×125 mm longitudinal were treated using as in Example 2 using solution 4 and after curing were tested for impact resistance by measuring the depth of indentation when a 4.6 kg weight with a hemi-spherical head of 25.3 mm diameter was dropped from a height of 500 mm on to the tangential face of each sample. Measurements were made at three points on each of five treated and five untreated samples. The mean depth of indentation of untreated samples was greater than the mean depth of indentation of treated samples (statistically significant at the 5% level).

EXAMPLE 7

Samples of radiata pine sapwood, selected on the basis of minimal grain deviation, of dimensions 150×10×10 mm were treated as described in Example 2 using solution 4, and were tested for stiffness (modulus of elasticity—MOE) and bending strength (modulus of rupture—MOR). Measurements were made on 10 treated samples and 10 matching samples of untreated radiata pine sapwood.

Mean MOE and MOR for treated and untreated are summarized as:

|  | MOE ($10^{10}$N/m$^2$) | MOR ($10^6$N/m$^2$) |
|---|---|---|
| Treated | 1.263 | 87.7 |
| Untreated | 1.132 | 109.7 |

These data show that the composite material has 25% better strength while maintaining the same flexibility as compared with untreated wood.

EXAMPLE 8

Samples of radiata pine sapwood of dimensions 40 mm×40 mm×5 mm longitudinal were treated as described in Example 2 using solution 2. The samples were then exposed to one white-rot and three brown-rot fungi in a modified version of the British Standard 6009 test procedure. Weight losses for treated and untreated material after eight weeks' exposure were as shown below.

|  | Weight Loss (%) | |
|---|---|---|
| Fungus | Treated | Untreated |
| C. versicolor | 1.53 | 8.58 |
| C. puteana | 1.10 | 31.80 |
| F. gilvus | 0.09 | 9.40 |
| G. sepiarium | 0.35 | 12.60 |

The results showed that the material was essentially decay-resistant under the simulated above-ground conditions of the test.

EXAMPLE 9

Samples of radiata pine sapwood were treated as described in Example 2 using solution 2 and after curing were exposed outdoors on 450 exposure racks facing north (Southern hemisphere). Colour saturation of depth of colour was measured as a function of time and compared with that of untreated samples. After four months the colour saturation of the untreated samples had decreased by 65% whereas the colour saturation of the treated samples had only decreased by 15%. Similarly prepared samples of radiata pine sapwood were placed behind glass in cabinets facing north (Southern hemisphere) on a test fence. Colour was measured in L*a*b* colour space coordinates after 44 days exposure. Changes in average L*a*b valves were expressed as follows:

% change from original L* (lightness) a* (red-green axis) b* (yellow-blue axis)

| Treated | | | |
|---|---|---|---|
| in light | −2.6 | +3.5 | +7.0 |
| protected from light | −1.3 | +3.2 | +1.1 |
| Untreated | | | |
| in light | −4.8 | +11 | +38 |

The smaller difference in b* recorded for the treated material is indicative of less yellowing in the treated material than in untreated material and this is evidenced on examining the samples.

EXAMPLE 10

Samples of radiata pine sapwood of dimensions 230×63×19 mm were treated using as in Example 2 using solution 2, cured, and then tested for gluability using three adhesive types and the ASTM D-905 shear block test procedure. The mean force at failure for treated samples and untreated controls is summarized below:

Mean force at failure (MPa)

| Adhesive | Treated | Untreated |
|---|---|---|
| Resorcinol-formaldehyde | 15.11 | 10.14 |
| Epoxy | 9.89 | 8.62 |
| Urea-formaldehyde | 13.00 | 10.44 |

In each case the bond strength as measured by the shear block test was significantly greater for the treated samples than for the untreated samples.

EXAMPLE 11

Samples of radiata pine sapwood of dimensions 100×15×15 mm were prepared as in Example 2 using solution 4 and after curing were tested for surface hardness by measuring the force required to indent the surface by 0.2 mm and by 1 mm using a stainless steel wedge. Mean hardness values of 280 MPa at 0.2 mm wedge penetration and 220 MPa at 1.0 mm wedge penetration were recorded which compare with a range of 60–90 MPa for untreated radiata pine sapwood, and 100–110 MPa, for kiln-dried radiata pine sapwood.

EXAMPLE 12

Samples of radiata pine sapwood of dimensions 100×15×15 mm were treated as in Example 2 using solution 5 and after curing were tested for surface hardness as in Example 11. Mean hardness values of 180 MPa at 0.2 mm wedge penetration and 166 MPa at 1.0 mm wedge penetration were recorded.

The foregoing describes the invention and examples thereof. Alterations and modifications as will be obvious to those skilled in the art intended to be incorporated in the scope of the invention, as defined in the following claims.

What is claimed is:

1. A method of densifying lignocellulosic material, comprising impregnating the lignocellulosic material with a non-acidic impregnant, said non-acidic impregnant comprising a cross-linking agent and a maltodextrin having a dextrose equivalent of about 10 to about 30 and cross-linking or curing the maltodextrin to form a cross-linked product within the lignocellulosic material, thereby forming a densified lignocellulosic material.

2. A method as claimed in claim 1 wherein the cross-linked product is essentially water insoluble.

3. A method as claimed in claim 1 wherein the crosslinked product is water insoluble.

4. A method as claimed in claim 1, wherein the maltodextrin is impregnated into the lignocellulosic material together with a cross-linking agent having at least one hydroxyl group or alkylated hydroxyl group.

5. A method as claimed in claim 1, wherein the maltodextrin is partially reacted with the cross-linking agent prior to impregnation into the lignocellulosic material.

6. A method as claimed in claim 5 wherein the cross-linking agent is N-methylolacrylamide.

7. A method as claimed in claim 6, wherein cross-linking is carried out at a temperature from about 50° to about 140° C.

8. A method as claimed in claim 5, wherein the maltodextrin has a dextrose equivalent of from about 15 to about 30.

9. A method as claimed in claim 8, wherein the ratio of cross-linking agent molecules to maltodextrin molecules is from about 2:1 to about 5:1.

10. A method as claimed in claim 5, wherein impregnation is carried out in a sealed treatment vessel utilizing evacuation and/or pressure from about 50 kPa g to about 1400 kPa g.

11. A method as claimed in claim 1 wherein the cross-linking agent comprises a compound selected from the group consisting of compounds having an alkylated, hydroxymethyl, hydroxymethylene, or hydroxymethine group.

12. A method as claimed in claim 1 wherein the cross-linking agent comprises a compound selected from the group consisting of alkylated methylolmelamines, glycourils, benzoguanamines and methylol resins.

13. A method as claimed in claim 1 wherein the cross-linking agent is hexamethylmethylolmelamine.

14. A method as claimed in claim 12, and wherein the cross-linking agent is an alkylated methylolmelamine.

15. The method of claim 14, wherein the maltodextrin is partially reacted with the alkylated methylolamine and the partial reaction is stopped by addition of ammonia; and wherein the lignocellulosic material is impregnated with the mixture resulting from the partial reaction and following impregnation, the lignocellulosic material is heated to a temperature of about 50° to about 140° C.

16. A method of claim 15, wherein the cross-linking agent is hexamethylmethylolmelamine.

17. A method as claimed in claim 14, wherein the solution used for impregnating the lignocellulosic material comprises a catalyst and the pH of the impregnation solution is adjusted to at least 8 by addition of ammonia solution, said ammonia being added in an amount which does not catalyze crosslinking under the conditions under which the pH of the impregnation solution is adjusted, and wherein following impregnation, the lignocellulosic material is heated to a temperature of from about 50° to about 140° C.

18. A method of claim 17, wherein the cross-linking agent is hexamethylmethylolmelamine.

19. A method as claimed in claim 1 wherein the cross-linking agent comprises a non-alkylated methylol group and wherein cross-linking of the maltodextrin occurs via vinyl group polymerization.

20. A method as claimed in claim 19 wherein the ratio of cross-linking agent molecules to maltodextrin molecules is about 1:1.

21. A method as claimed in claim 1, wherein the lignocellulosic material is wood.

22. A method as claimed in claim 1, wherein the lignocellulosic material is wood in the form of wood veneers and cross-linking or curing is carried out by hot pressing the veneer to a substrate after impregnation or by cold pressing the veneer to a substrate after impregnation followed by heating the veneer.

23. Densified lignocellulosic material produced by the method of claim 1.

24. A method of densifying lignocellulosic material comprising:

(a) preparing an impregnation solution comprising an alkylated methylomelamine, maltodextrin and a catalyst and adjusting the pH to at least 8 by addition of ammonia solution said ammonia being added in an amount which does not catalyze crosslinking under the conditions under which the pH of the impregnation solution is adjusted;

(b) impregnating lignocellulosic material with the impregnation solution; and (c) following impregnation, heating the lignocellulosic material to a temperature of from about 50°–140° C. to form a densified lignocellulosic material.

25. A method of claim 24, wherein the cross-linking agent is hexamethylmethylolmelamine.

26. Densified lignocellulosic material prepared by the method of claim 24.

27. A method of densifying lignocellulosic material comprising:

(a) partially reacting maltodextrin with an alkylated methylolmelamine;

(b) stopping the partial reaction by addition of ammonia;

(c) impregnating lignocellulosic material with the mixture resulting from the partial reaction; and (d) following impregnation, heating the lignocellulosic material to a temperature of from about 50° to about 140° C. to form a densified lignocellulosic material.

28. A method of claim 27, where the cross-linking agent is hexamethylmethylolmelamine.

* * * * *